Patented Mar. 27, 1928.

1,664,182

UNITED STATES PATENT OFFICE.

MAURICE PARISI, OF CORONA, NEW YORK.

DENTAL POWDER.

No Drawing.   Application filed March 12, 1925. Serial No. 15,151.

The present invention relates to improvements in tooth powders, and in the method of making the same, and it is the principal object of the invention to provide a tooth powder which refreshes the gums, reaches all parts of the teeth, cleans the teeth positively and thoroughly and possesses a pleasant taste, aroma and color.

Another object of the invention is the provision of a novel, inexpensive tooth powder and the making of the same by an efficient, yet simple method, thus saving expense and labor.

These and other objects and advantages of my invention will become more fully known as the description thereof proceeds, and will then be more specifically pointed out in the appended claim.

To accomplish these results, I use powdered rice, powdered beans, powdered bones and a coloring matter, one preferably giving the mass a light red color.

The preferred form of the novel tooth powder contains the above ingredients in the following proportions by weight which I have found in practice to give the best results: 40 grammes (14 ounces) powdered rice, 25 grammes (8,75 ounces) powdered white beans, 5 grammes (1,75 ounces) powdered bone, and 2 grammes (0,70 ounces) carmine.

The rice and beans are minutely powdered and to this mass an extremely fine powder made from bird, fish or other bones is added whereafter the mass is colored by the addition of carmine powder, all in the above outlined proportions.

The abrasive action of a tooth powder, of course, is controlled by the hardness or softness of the ingredient powders, together with whether the ingredient powders absorb moisture, or not. By the abrasive body of a tooth powder is meant, only the ingredients intended to have an abrasive action, not including other ingredients, for example, coloring or perfuming matters. The action of this tooth powder is purely mechanical. The abrasive body is formed of powdered bone, surrounded by a much larger quantity of powdered beans, both in turn being surrounded by a much larger quantity of powdered rice. As the user rubs the tooth powder against his teeth, saliva mixes therewith. The bean powder absorbs moisture much more readily than the other ingredients, and forms a paste-like substance, which carries the rice powder and the bone powder. Gradually the rice powder also forms in a paste, and the whole paste carries the bone powder. In this manner the powders work to produce a unitary abrasive action.

The entire mass is then rapidly stirred and mixed in a mechanical or other mixing apparatus, and the resulting powder will be found to constitute an excellent tooth powder which is refreshing to the gums, positively cleaning the teeth and entering all spaces and crevices to effect a thorough cleaning, while having a pleasing taste, aroma and appearance.

It will be clear that changes may be made in the ingredients, and in the proportions of mixing and combining the same without departure from the scope of the invention as defined in the claim.

Having thus described my invention, what I claim as new, and desire to protect by Letters Patent is:

A tooth powder comprising non-absorbing powdered bone, bean powder, and rice powder in the ratio of 5 : 25 : 40, said mixture being adapted to exert a combined abrasive effect when first applied to teeth in a substantially dry state, said bean powder being adapted to rapidly absorb moisture forming a paste covering said powdered bone and powdered rice for reducing the abrasive power of said mixture after preliminary cleaning of said teeth and said rice powder being adapted to absorb moisture thereafter resulting in a thicker paste of less abrasive capacity for polishing the teeth after the cleaning thereof.

In testimony whereof I have affixed my signature.

MAURICE PARISI.